BEST AVAILABLE COPY

Aug. 14, 1951 F. H. TURNHAM ET AL Re. 23,400

ELECTRIC LOW AND HIGH-VOLTAGE FUSES

Original Filed Jan. 21, 1948 3 Sheets-Sheet 1

INVENTORS
Pitchugh Hobson Turnham
and Edgar William Garrison, Jr.
BY
Chas. Denegre
Attorney

BEST AVAILABLE COPY

Aug. 14, 1951 F. H. TURNHAM ET AL Re. 23,400

ELECTRIC LOW AND HIGH-VOLTAGE FUSES

Original Filed Jan. 21, 1948 3 Sheets-Sheet 2

INVENTORS
Pitzhugh Hobson Turnham
and Edgar William Garrison, Jr.
BY
Chas. Denegre
Attorney.

BEST AVAILABLE COP'

Aug. 14, 1951 F. H. TURNHAM ET AL Re. 23,400

ELECTRIC LOW AND HIGH-VOLTAGE FUSES

Original Filed Jan. 21, 1948 3 Sheets-Sheet 3

INVENTORS
Pitzhugh Hobson Turnham
and Edgar William Garrison, Jr.
BY
Chas. Denegre
Attorney.

BEST AVAILABLE COPY

Reissued Aug. 14, 1951

Re. 23,400

UNITED STATES PATENT OFFICE 23,400

ELECTRIC LOW AND HIGH-VOLTAGE FUSES

Fitzhugh Hobson Turnham and Edgar William Garrison, Jr., Birmingham, Ala., assignors to USCO Power and Equipment Corp., Birmingham, Ala., a corporation of Alabama Original No. 2,485,221, dated October 18, 1949, Serial No. 3,618, January 21, 1948. Application for reissue May 2, 1950, Serial No. 159,632

15 Claims. (Cl. 200—114)

Matter enclosed in heavy brackets [ ] appears in the original patent but forms no part of this reissue specification; matter printed in italics indicates the additions made by reissue.

[This invention relates to low and high voltage electric fuses. It has for its main objects to provide such a fuse that will be highly efficient for its purpose, simple in structure, comparatively cheap to manufacture, and very durable.]

[A further object is to provide a double breaking fuse, latched at both ends, this being a novel idea in such devices. The use of two tubes that break at the center of the span, results in a great advantage in the springing means for moving the two short tubes into the open position rather than lifting one long tube equal in length to the two short tubes.]

[A further object is to provide a latch on the hinge ends of the double breaking fuse that is so designed that when the tube is swung to the closed position the impact of latching the fuse imposes no stress or strain on the fuse link. A further advantage of the invention is that the two tubes are latched on the mechanism ends and a fuse link is drawn through the two tubes to the latches. The fusion of any part of the link will automatically unlatch both tubes and the springs in the mechanism will swing the tubes from closed to open position. When the tube is in motion a cam binds on a spring-pressured brake that stops the two part tube with a minimum of shock or impact on the supporting insulators.]

[Other objects and advantages will appear from the drawings and description.]

[By referring to the drawings part of this application, it will be observed that Fig. 1 is an elevational view of the double breaking horizontal fuse; Fig. 2 is an elevation of the hinge mechanism assembly in closed position; Fig. 3 is an enlarged detail view of the connecting portions of the two tubes; Fig. 4 is an elevation of the hinge mechanism assembly in open position, tube broken away; Figs. 5 and 6 are elevations of the latch assembly in open and closed positions; Fig. 7 is an end view of the latch assembly in closed position; Fig. 8 is a detail view showing braking mechanism, with cover removed, in closed position; Fig. 9 is a detail view showing braking mechanism, with cover removed, in open position; Figs. 10 and 11 are detail cross sectional views showing spring arrangement with tube in closed position.]

[Similar reference numerals refer to similar parts throughout the several views.]

[Referring to the drawings in detail it will be seen that the device comprises a main metal base 1 supporting insulators 2 carrying individual bases 3. The two fuse tubes 4 and 4′ are latched in closed position by latches being engaged to catch members 6. The fuse link 7 is stretched through both tubes 4 and 4′ and attached in slots of link ejectors 8 and there held securely to the tube supports 9 by thumb screws 10. Springs 11 tend to stretch the fuse link through the two tubes, and upon rupture of the link the springs 11 rotate the ejectors 8 about pins 12 thus moving the pins 8′ on an arc around pins 12. The pins 8′ of the ejectors 8 fit in slots 5′ and when the arcs of the pins 8′ are completed the latches 5 are moved or pivoted about pins 13 to the unlatched position. Thus this latch arrangement exerts no stress upon the fuse link 7 except pressure of the springs 11. After the tubes 4 and 4′ are unlatched the springs 14 swing them around pins 15 to the open position. The main tube castings 9 have cam arms 9′ that move in arcs about pins 15; each brake housing 16 is moved up in an arc about the pins 17 by the cam arm 9′ binding on the inner curved surface of the housing 16. As the housing 16 is pivoted about pin 17 the spring 18 is compressed. Adjusting bolt 19 is stationary with the base 3 and can be loosened or tightened on the spring cover 20 to give the required pressure on the spring 18 to provide an easy and shockless movement of the tubes 4 and 4′. Non-metallic covers 21 are connected to the ends of the tubes, and are mitered to a semi-weathered proof condition for the ends of the tubes.]

[The open position of the mechanism as shown in Fig. 4 shows the latch and link ejector at rest in the completed, unlatched position. Note that the fuse link 7 has been drawn from the fuse tube, upon the fusion of the link, by the link ejector 8, and the frayed ends of the link are resting in the basket 22 shown in broken lines. Spring 18 is in compression because cam arm 9′ has completed its arc and raised the brake housing 16 about pin 17.]

[When the fuse link is threaded through the fuse tube the link ejector 8 is pulled down to the latched position. In this position any pressure applied to the latch 5 by catch member 6 does not exert any strain on the fuse link. As the link ejector 8 has to move in arc about pin 12, any pressure trying to move pin 8′ will exert resulting force directly into pin 12. Spring 11 flipping link ejector 8 around pin 12 moves pin 8′ engaged in slot 5′. The latch 5 pivots about pin 13 resulting in a counterclockwise movement at point of contact of latch 5 to catch member 6, this being the unlatching motion.]

[When the main tube casting member 9 is in closed position cam arm 9′ is engaged to curved

BEST AVAILABLE COPY surface of the friction housing 16 at all times, but the pressure of spring 18 is negative and the friction is slight. The friction being applied at all times, increasing as the fuse tube swings to the open position, reduces the shock of the sudden stopping of the fuse tube.]

[The spring arrangement for swinging the fuse tube to the open position has the springs 14 in series, thus the pressure tending to move the tube casting member about pin 15 has the advantage of both springs applied. The springs are supported by a mandrel 23 (spacer) on pin 15. The stationary end of the spring assembly is held attached by a clamp bolt 24 to the mechanism base 3, while the other end presses on the main tube casting member 9.]

[The various parts of the fuse may be made of any material suitable for the purpose, but we prefer to use such metals and other materials generally used in the manufacture of such electrical equipment. Also the device may be made in various sizes and capacities. The invention resides in the arrangement and combination of the parts, not the materials of which they are made.]

[While we have shown and described the preferred embodiment of our invention, we do not wish to limit same to the exact and precise details of structure, but reserve the right to make all modifications and changes so long as they remain within the spirit and scope of the following claims.]

*This invention relates to low and high voltage electric fuses and has for its general object and purpose to provide a durably constructed fuse of this type which will be highly efficient in practical operation and embodies a comparatively simple assembly of a minimum number of structural elements, whereby maximum production economies may be realized.*

*A primary particular object of the invention is to provide an electric fuse device, having a fuse tube pivotally supported at one end for swinging movement, with a novel latching and fuse link extracting means carried by the tube and operative upon overload of the circuit to extract the fuse link from the tube and release the tube for swinging movement to open-circuit position.*

*A further important object of the invention is to provide a simple and novel snubbing or shock absorbing means for retarding swinging movement of the fuse tube to its open-circuit position.*

*An additional object resides in the provision of an improved pivotal mounting and novel arrangement on the tube of the fuse link extracting and latching elements interconnected by motion transmitting means which, in the closed-circuit condition of the fuse link, interlocks said elements against relative pivotal movement so that additional stress is not applied to the fuse link by the latching impact.*

*It is a further object of the invention in one of its embodiments to provide two relatively short tubes through which the fuse link is threaded, each pivotally supported at one end on an insulated terminal with a fuse link extracting and tube latching means mounted on the pivoted end of each tube, together with spring means for moving said tubes to open-circuit position.*

*Other subordinate objects and advantages of the invention will more fully appear as the description proceeds in connection with the accompanying drawings, wherein similar reference characters designate corresponding parts*

*throughout the several views and appended claims:*

Figure 1:
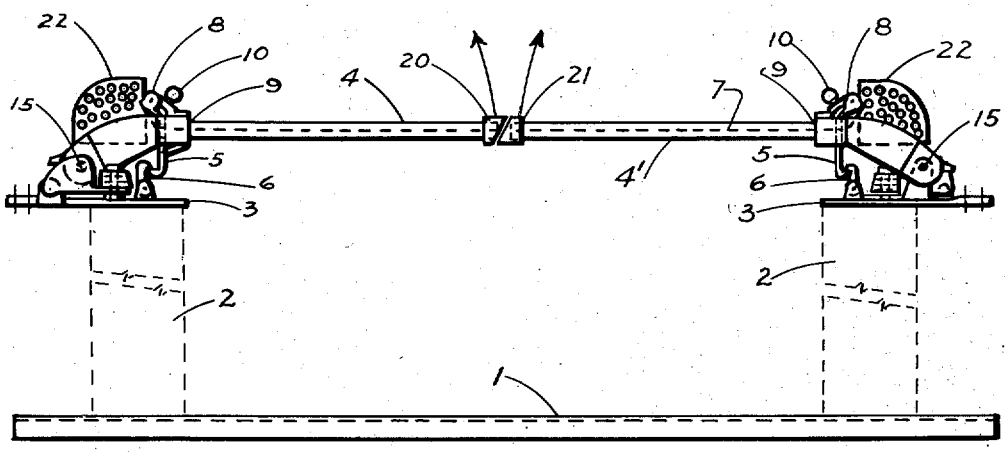
*Figure 1 is a side elevation illustrating a double tube type fuse device embodying the present invention wherein the fuse containing tubes are latched in aligned closed-circuit position;*

*Referring in further detail to the drawings, and particularly to Figure 1 thereof, a double fuse type arrangement made up of a pair of horizontally spaced insulators 2 rigidly mounted upon a suitable base 1 is illustrated. Upon the upper end of each insulator a metal terminal member 3 is securely fixed. The usual line conductors (not shown) are adapted to be connected to the respective members 3 in any suitable manner. A pair of fuse tubes 4—4′ are respectively supported upon the terminals 3 for swinging movement from a circuit-closing position in alignment with each other to an open-circuit position. A flexible link 7 is threaded through these tubes, which are constructed of a suitable insulating material. Link 7 is provided with the usual intermediate fusable section as is well known in the art. Means is associated with each of the tubes to releasably latch the tubes in closed-circuit position and to automatically extract the sections of the link 7 from the respective tubes upon overload of the electrical circuit. Since this latching and link extracting means for each tube, as well as the means for swingingly mounting the respective tubes upon the terminal 3 is of the same construction, the detailed description of one will suffice for both.*

Figure 2:
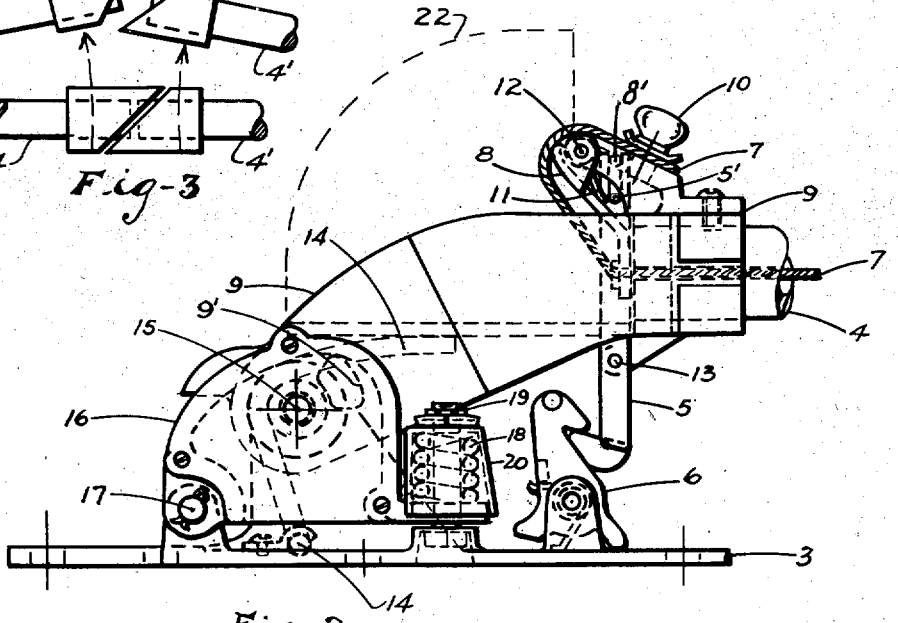
*Figure 2 is an enlarged fragmentary side elevation of the pivotally mounted end of one of the fuse tubes latched in its closed position;*
Figure 4:
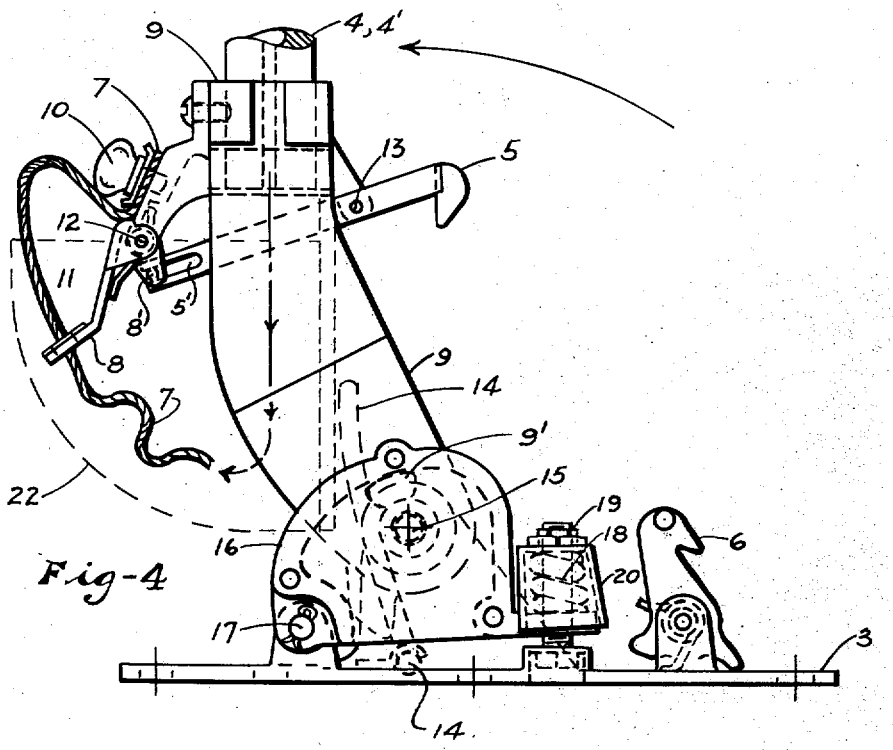
*Figure 4 is a fragmentary side elevation of one of the tubes, similar to Figure 2, but showing the tube in open-circuit position;*
Figure 5:
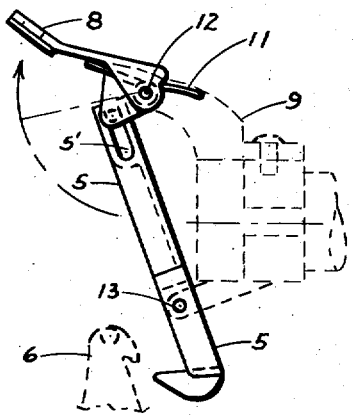
*Figures 5 and 6 are detail side elevations of the link extracting and latch assembly of Figures 1 through 4 showing the latter in open and closed position respectively;*

*As shown most clearly in Figures 2 and 4 of the drawings, a casting 9 is suitably fixed at one of its ends to one end of the fuse tube and its other end is pivotally supported by a pin 15 mounted adjacent its opposite ends in upstanding bearing lugs or ears formed on terminal member 3. Preferably, a spacing sleeve 23 surrounds shaft 15 and a pair of coil springs 14 surrounds said sleeve. These springs at one of their ends are secured to member 3 by suitable fastening elements 24 and at their other ends engage casting 9 and exert a rotating thrust to casting 9. It will, therefore, be understood that these springs tend to bias the*

BEST AVAILABLE COPY fuse tube in one direction from a closed-circuit position to an open-circuit position about normal to the plane of terminal 3.

The fuse tube is releasably held in the closed-circuit position of Figure 1 by means of the latch element 5 pivotally mounted intermediate its ends as at 13 upon the casting 9. One end of latch 5 is provided with a latching nose for engagement with the upper end of a complementary keeper 6 pivotally mounted as at 6' upon terminal 3 and biased to normal position by a suitable keeper spring. The other end of latch element 5 is provided with a longitudinally extending slot 5', the purpose of which will be presently explained.

Figure 6:
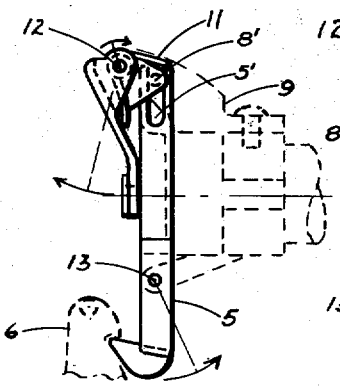
Figure 7:
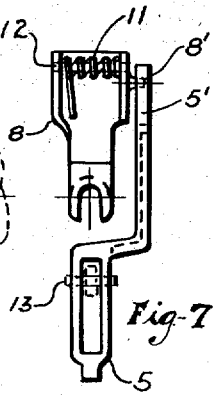
*Figure 7 is an end elevation of the assembly shown in Figure 6;*

The forward end of casting 9 opposite pivot 13 supports a terminal bracket member having a link extracting member 8 pivotally mounted thereon as at 12. Extracting member 8 is provided at one end with a slot (Figure 7) through which the fuse link 7 is slidably received. Member 8 at its other end has an angularly projecting part carrying a pin 8' which is slidably engaged in the slot 5' of the latch element 5. A spring 11 having one end coacting with member 8, surrounds pivot 12 and has its other end protruding beyond pivot 12 in a direction opposite that of member 8 into abutting engagement with the terminal bracket of casting 9. The ends of link 7 extend through and from the slotted end of respective members 8 longitudinally over the members 8 and around and beyond pivots 12 and are securely fixed to the terminal brackets of castings 9 by thumb screws 10. The link 7, when drawn tight between the respective thumb screws 10, tensions the respective springs 11 thus conditioning them to urge members 8 in one direction around their pivots to maintain the fuse link 7 under tension. In this normal operative position of the parts, as seen in Figures 1 and 6, with the fuse arms being swung to closed-circuit position, latch element 5 and keeper 6 are cooperatively engaged and pin 8' is vertically aligned with pivot 13 of latch element 5, and horizontally offset with respect to pivot 12 of member 8, which pivot is substantially vertically aligned with the pivot axis of keeper 6 as shown most clearly in Figure 2. Due to the above described location of pin 8' and the various pivot points and as the keeper spring is relatively light, the only substantial forces acting on latch element 5 and keeper 6 in this normal operating position are applied lengthwise between pivot 13 and the pivot of keeper 6. As a consequence, no effective rocking forces are applied to latch element 5, nor is any additional stress placed upon fuse link 7 as a result of the tension of fuse tube actuating springs 14.

From the above description, it will be readily seen that upon rupture of the fusable section of link 7 by overload on the circuit the tensional stress of springs 11 is released to rock members 8 around pivots 12 to thereby extract the disconnected end sections of the link from the respective tubes 4 and 4' and to simultaneously effect arcuate movement of pins 8' against the sides of slot 5' of latch elements 5 to respectively rock latch elements 5 about pivots 13 in a direction to disengage noses of latch elements 5 from the keepers 6 of terminals 3. Springs 14 then swing the fuse tubes upwardly about pivot pins 15 to open-circuit position.

Figure 3:
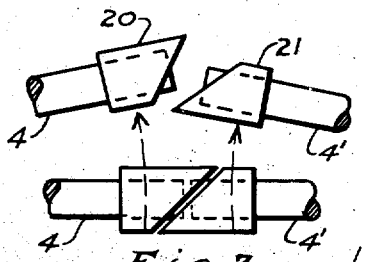
*Figure 3 is an enlarged detailed view showing the mitered weather guards on the free open ends of the tubes;*

Preferably castings 9 carry baskets 22 having perforated walls which receive the extracted end portions of the fuse links. The free ends of the tubes 4 and 4' are preferably provided with non-metallic shields or cover elements respectively indicated by numerals 20 and 21, the opposed ends of which are mitered to assume a closely parallel relation with each other in the closed-circuit position of the tubes as seen in Figures 1 and 3, and thus provide a semi-weather proof condition for the open ends of the tubes.

Figure 8:
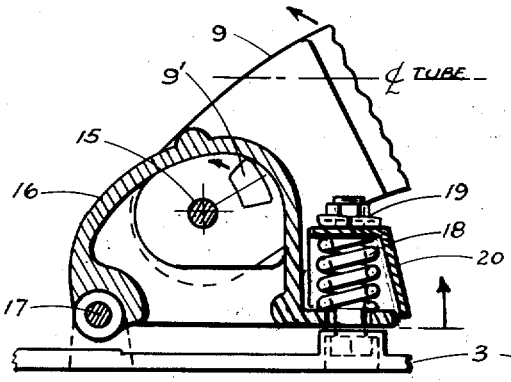
*Figure 8 is a detail vertical sectional view showing the retarding or braking mechanism for each tube with the latter disposed in its closed position;*
Figure 9:
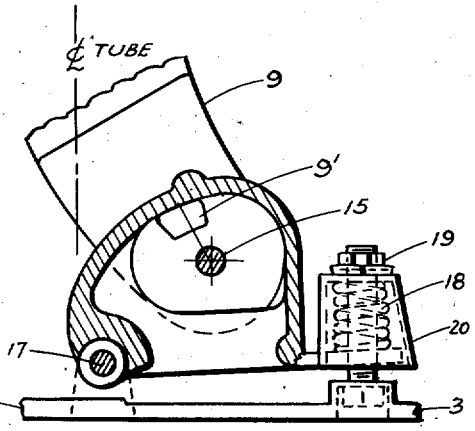
*Figure 9 is a similar sectional view, the fuse tube being shown in its open position;*
Figure 10:
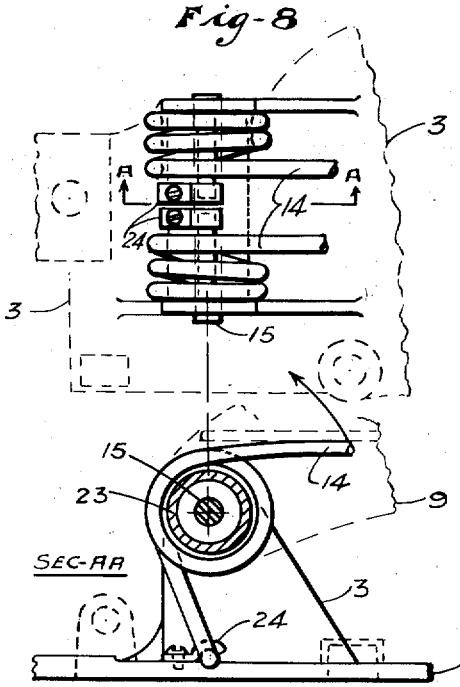
*Figure 10 is a combined top plan and vertical sectional view showing the mounting and arrangement of the spring means for moving the fuse tube to open-circuit position; and*
Figure 11:
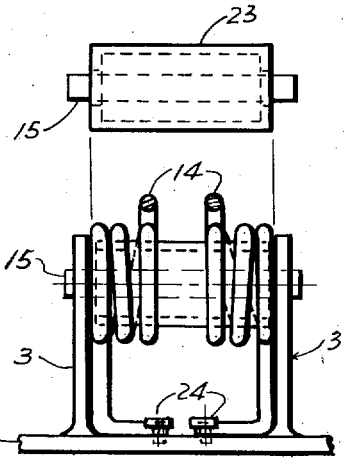
*Figure 11 is a combined end elevation and top plan view of the lower portion of Figure 10, the spring and mounting members being omitted in the plan view portion thereof;*

As the energy stored in the springs 14 is considerable, the present invention provides a simple and effective means for controlling or governing the action of the springs to minimize shock and possible damage to parts of the tube mounting assembly in the movement of the tube to its open-circuit position. Referring more particularly to Figures 8 and 9 of the drawings, a braking member in the form of a housing 16 is pivotally supported at its rear lower corner, as shown at 17, upon the terminal member 3 at one side of the pivotally supported end of the casting 9. This housing has an inner top wall surface disposed eccentrically with relation to the pin 15 and a side wall opposed to casting 9 having an opening therein through which a lug 9' on casting 9 extends. Lug 9' has frictional contact with the eccentrically curved inner wall surface of the housing in the upward pivotal movement of casting 9 about pin 15, whereby the brake housing 16 will be swung upwardly in an arc about pivot 17. At its lower end opposite pivot 17 housing 16 has a projecting apertured flange through which a bolt 19 loosely extends. Bolt 19 at its lower end is non-rotatably connected with the base of terminal 3. A coil spring 18 and spring cover 20 are assembled on bolt 19 by a nut threaded on the upper end of the bolt bearing upon cover 20 to adjust or regulate the resistance of spring 18 to pivotal rocking movement of brake housing 16.

From the above description, it will be apparent that when the fuse tube and castings 9 are swung upwardly about pin 15 by the action of springs 14, such movement of the tube and casting to the final open-circuit position is progressively retarded or restrained by the frictional engagement of lug 9' with the eccentrically curved housing wall 16, the upward rocking movement of housing 9 effecting a compression of spring 18 which applies a progressively increasing resistance to the movement of the housing relative to the terminal 3, as most clearly seen in Figure 9 of the drawings. In this manner, violent shock or impact is avoided and possible breakage or damage of the contacting parts of the assembly is obviated.

The various parts of the improved electrical fuse device illustrated are of simple and durable structural form and can be readily fabricated from materials commonly used in the art for this purpose. It will also be apparent that the device can be made in various different sizes for low or high voltage circuits and is adaptable to single tube fuses.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

Having described our invention, we claim:

1. In an electric fuse of the character described comprising; a main supporting base 1, two insulators 2 mounted and spaced apart upon said base 1, a separate mechanism supporting

BEST AVAILABLE COPY base 3 mounted upon each of the said insulators, two duplicate tube assemblies mounted one on each of the bases on the insulators, each assembly consisting of a fuse containing tube 4 with one end thereof attached in a housing 9 that is swingable on a shaft 15 supported in a second housing 16 that is swingable on a shaft 17 supported on a base 3; a latch arm 5 mounted on a shaft 13 supported on the housing 9, said arm 5 having an L-shaped end, a latch member 6 supported on the base 3, a coil spring attached to said latch member and positioned normally disposed to urge the free end of the latch away from the housing 16, the L-shaped end of the arm 5 being adapted to make contact with the latch 6 when the tube 4 is positioned parallel to the base 1; a fuse inserted through said tubes, each end of the fuse attached by thumb screws 10 to part of the housing 9, said fuse in taut condition being adapted by trigger means on the end of arm 5 to retain said tubes in parallel position with relation to base 1, and being adapted to allow the free ends of the tubes to move away from the center portion of the base 1 as a result of rupture of the fuse; spring means mounted in each said housing 16 and being adapted to urge the free ends of said tubes away from the center portion of base 1 when said fuse is in ruptured condition.]

[2. In an electric fuse of the class described comprising; a main supporting base 1, two insulators 2 mounted and spaced apart upon said base 1, a separate mechanism base 3 mounted upon each of said insulators, attached to each mechanism base a swingable latch assembly consisting of a metal housing 9, a latch arm 5 mounted on a shaft 13 through the housing swingable portion, an ejector 8, a coil spring 11 mounted on a shaft 12 and positioned normally to urge the ejector 8 away from the latch arm 5; an L-shaped extension integral with the latch arm 5, a stud 8′ integral with the ejector 8, said stud 8′ positioned slidable in a slot 5′ in the latch arm 5; the housing having a round hole therein, a tube 4 attached by one end thereof in said round hole, an electric fuse 7 threaded through said tube 4 and over the ejector 8 and attached to the swingable housing 9 by a thumb screw 10; said fuse also threaded through a similar tube attached to the other companion similar latch assembly, said fuse positioned in taut condition being adapted to hold said tubes in parallel position with relation to the plane of the base 1, a latch hook member 6 mounted on each mechanism base and positioned to engage the L-shaped extension of each latch arm 5 when the fuse is in threaded taut condition; springs 14 mounted on a shaft 15 in each mechanism fixed portion, the swingable portions of the housings mounted on said shafts, the springs in the housing fixed portions normally set to urge the swingable portions of the assemblies to a position away from the center portion of the base 1; said two tubes being approximately equal in length, the free end of each tube being mitered and adapted to coact and fit adjacent each other when the threaded fuse is in taut condition and adapted to separate and swing apart upon rupture of the said fuse threaded through the two tubes.]

*3. In an electric fuse device, spaced insulated terminals; a fuse tube; means pivotally mounting said tube at one end thereof upon one of said terminals, a fuse link extending through said tube; means normally electrically connecting said link with said terminals; a fuse link extracting lever pivotally mounted on said tube and having means at one end engaged with said fuse link; spring means biasing said lever in a direction to maintain said link under tension; means releasably holding said tube against movement to open-circuit position including a latch element pivotally mounted on said tube; and a motion transmitting connection between said link extracting lever and said latch element adapted upon fusing of the link to release said lever for movement in said one direction to extract the link from the tube and release said latch element to simultaneously release the tube for pivotal movement to open-circuit position.*

*4. An electric fuse device as defined in claim 3, wherein said motion transmitting connection comprises a direct pin and slot connection between said link extracting lever and latch element.*

*5. An electric fuse device as defined in claim 3, wherein said link engaging means at said one end of said extracting lever comprises a slot in said extracting lever and said link extends through said slot and longitudinally over said lever to said terminal connecting means.*

*6. An electric fuse device as defined in claim 3, wherein said motion transmitting connection comprises a pin on said extracting lever spaced from the pivot thereof and disposed in closed circuit condition of said tube and fuse link in engagement with said latch element at the point of intersection of a plane containing the pivot axis of said lever and disposed substantially normal to the longitudinal axis of said latch element to lock said latch element against movement to non-latching position.*

*7. An electric fuse device as defined in claim 3, together with means restraining movement of said tube to open-circuit position.*

*8. An electric fuse device as defined in claim 7, wherein said restraining means comprises a member pivotally mounted on said one terminal and having a cam surface eccentric to the pivot of said tube, a lug movable with the tube about said pivot and frictionally coacting with said cam surface to pivotally move said member, and spring means yieldingly resisting said pivotal movement of said member relative to said tube.*

*9. An electric fuse device as defined in claim 3, together with an energy storing device operatively associated with the pivoted end of said tube and energized by movement of the tube to closed-circuit position to pivotally move said tube to open-circuit position upon release of the tube by said latch element.*

*10. An electric fuse device as defined in claim 9, together with means governing the effective action of said energy storing device to brake movement of said tube to open-circuit position.*

*11. An electric fuse device as defined in claim 3, wherein said pivotal mounting for said tube comprises a casting fixed to the tube and mounted for swinging movement about a pivot supported on said one terminal, and spring means coacting with said casting and operative upon release of the tube to swing said tube to open-circuit position.*

*12. An electric fuse device as defined in claim 11, together with means for progressively retarding movement of said tube under the action of said spring means.*

*13. In an electric fuse device, comprising a terminal, a fuse tube, and means pivotally mounting said tube at one end thereof upon said terminal: a fuse link extending through said tube;*

BEST AVAILABLE COPY

*means normally electrically connecting said link with said terminal; a fuse link extracting member movably mounted on the pivotally supported end of said tube and engaged with said fuse link in spaced relation from said terminal connecting means; spring means biasing said member in a direction to maintain said fuse link under tension; means releasably holding said tube against movement to open-circuit position including a latch element movably mounted on said pivotally supported end of the tube; and a motion transmitting connection between said extracting member and said latch element, whereby upon fusing of the link said member is moved in said biased direction to extract the link from the tube and to simultaneously actuate said latch element to release the tube for movement to open-circuit position.*

*14. In an electric fuse device, spaced terminals; a pair of fuse tubes; means pivotally mounting said tubes on the respective terminals for movement into and out of axially aligned relation with each other; a flexible link extending through said tubes and having an intermediate fusible section; means normally electrically connecting said link at opposite ends thereof with the respective terminals; fuse link extracting means movably mounted on each tube adjacent to its pivoted end and maintaining the fuse link under tension in the aligned closed-circuit position of said tubes; latch means individual to said tubes to releasably retain the tubes in aligned closed-circuit position; and a motion transmitting connection between each link extracting means and the corresponding tube latch means operative upon fusing of said fusible link section, to actuate the respective latch means and release said tubes for movement to open-circuit position.*

*15. An electric fuse device as defined in claim 14, together with means for applying a progressively increasing retarding force to movement of said tubes to open-circuit position.*

*16. An electric fuse device as defined in claim 14, together with an energy storing device operatively associated with each tube and energized by movement of said tubes to aligned closed-circuit position to pivotally move said tubes, upon release of the tubes by the respective latch means, to open-circuit position.*

*17. An electric fuse device as defined in claim 16, together with means governing the effective action of each energy storing device to restrain movement of said tubes to open-circuit position.*

FITZHUGH HOBSON TURNHAM.
EDGAR WILLIAM GARRISON, JR.

REFERENCES CITED

The following references are of record in the file of this patent or in original patent:

UNITED STATES PATENTS

| Number | Name | Date |
|---|---|---|
| 675,383 | Greenstreet et al. | June 4, 1901 |
| 2,365,113 | Schultz | Dec. 12, 1944 |